US012269660B2

(12) United States Patent
Lawrence

(10) Patent No.: US 12,269,660 B2
(45) Date of Patent: Apr. 8, 2025

(54) SELF-LOCKING TIE CORDS AND SYSTEMS, AND RELATED METHODS OF USE

(71) Applicant: John Paul Lawrence, Washington, DC (US)

(72) Inventor: John Paul Lawrence, Washington, DC (US)

( * ) Notice: Subject to any disclaimer, the term of this patent is extended or adjusted under 35 U.S.C. 154(b) by 169 days.

(21) Appl. No.: 18/085,765

(22) Filed: Dec. 21, 2022

(65) Prior Publication Data

US 2023/0193663 A1 Jun. 22, 2023

Related U.S. Application Data

(60) Provisional application No. 63/292,294, filed on Dec. 21, 2021.

(51) Int. Cl.
*B65D 63/10* (2006.01)
*E05B 75/00* (2006.01)

(52) U.S. Cl.
CPC .......... *B65D 63/1027* (2013.01); *E05B 75/00* (2013.01)

(58) Field of Classification Search
CPC .. E05B 75/00; B65D 63/1027; Y10T 24/1498
USPC .......................................... 70/17, 16, 328, 15
See application file for complete search history.

(56) References Cited

U.S. PATENT DOCUMENTS 539,650 A * 5/1895 Name not available .................... E05B 75/00 70/15
711,778 A * 10/1902 Name not available .................... E05B 75/00 D11/87
1,545,660 A 7/1925 Johnson
2,459,712 A * 1/1949 Messina .................. E05B 75/00 70/16
3,303,539 A * 2/1967 White .................... B65D 63/10 63/3
3,597,803 A * 8/1971 Van Neil ............ B65D 63/1027 24/16 PB
3,855,670 A * 12/1974 Brudy ................ B65D 63/1081 24/16 PB
3,933,015 A 1/1976 Balicki
4,038,725 A * 8/1977 Keefe ........................ G09F 3/14 292/322
4,069,825 A * 1/1978 Akiyama ......... A61B 17/06166 606/174
4,136,148 A * 1/1979 Joyce .................... F16L 3/2332 264/291

(Continued)

FOREIGN PATENT DOCUMENTS

DE 2617856 A * 5/1977 ......... A61B 17/0467
DE 202005017116 U1 * 3/2006 ............. E05B 75/00

(Continued)

*Primary Examiner* — Christine M Mills
*Assistant Examiner* — Steven A Tullia
(74) *Attorney, Agent, or Firm* — John P. Lawrence

(57) ABSTRACT

One variation of a self-locking tie cord includes a) a linear series of a plurality of nodules coupled together by a connective stem; b) a lock, coupled to one end of the connective stem, including a planar opening and configured to allow a nodule from the series of nodules to pass through the planar opening in a first direction orthogonal to the planar opening or a second direction orthogonal to the planar opening and opposite to the first direction only when the nodule applies a sufficient force to the planar opening.

17 Claims, 8 Drawing Sheets

(56) References Cited

U.S. PATENT DOCUMENTS 4,240,183 A * 12/1980 Sumimoto ................ G09F 3/14
248/222.12
4,351,169 A * 9/1982 Plymale .................. E05B 75/00
70/16
4,697,833 A * 10/1987 Swift ...................... G09F 3/037
292/318
4,711,002 A 12/1987 Kreeger
4,854,014 A * 8/1989 Ueno .................... F16B 21/088
292/319
4,854,138 A * 8/1989 Charland ................ E05B 75/00
24/30.5 R
4,991,265 A * 2/1991 Campbell .......... B65D 63/1027
24/129 R
5,181,402 A 1/1993 Faessler et al.
5,370,661 A * 12/1994 Branch ................. A61F 2/0811
24/17 AP
5,520,691 A * 5/1996 Branch .................. A61B 17/08
606/301
5,673,829 A * 10/1997 Hartshorn ................. A45F 5/02
224/256
5,794,461 A 8/1998 Smith
5,799,376 A * 9/1998 Harsley .................. B65D 63/10
24/17 AP
5,836,053 A * 11/1998 Davignon ............... F16L 3/233
24/17 AP
5,894,748 A * 4/1999 Capperrune .......... A61F 5/3761
70/18
6,446,474 B1 9/2002 Tabacchi et al.
6,640,393 B2 * 11/2003 Wendle .................. B65D 63/18
24/17 AP
6,681,451 B1 * 1/2004 Adams ............... B65D 63/1027
24/17 AP
6,807,715 B1 * 10/2004 Blair .................. B65D 63/1027
24/17 A
6,961,979 B2 * 11/2005 Wendle ............. B65D 63/1027
24/17 AP
7,513,017 B2 * 4/2009 Stewart .............. B65D 63/1081
24/30.5 P
7,703,817 B2 * 4/2010 Mangone, Jr. .......... G09F 3/037
292/307 R
7,757,357 B2 * 7/2010 Stewart .............. B65D 63/1081
24/17 AP
8,734,520 B2 * 5/2014 Zwirkoski ............ A61B 17/686
623/17.16
8,850,675 B2 * 10/2014 Frydlewski ............ A43C 11/22
24/712
9,021,665 B2 * 5/2015 Chen .................. B65D 63/1027
24/17 AP
9,340,340 B2 * 5/2016 Beckman ........... B65D 63/1018
9,499,317 B2 * 11/2016 Comaniuk .............. F16L 3/137
10,279,972 B2 * 5/2019 Hyde ................. B65D 63/1027
10,513,380 B2 * 12/2019 Watson .............. B65D 63/1027
10,683,150 B2 * 6/2020 Dinh .................. B65D 63/1072
11,213,106 B2 * 1/2022 Tsai ......................... A45D 8/34
11,673,724 B2 * 6/2023 Wendle .............. B65D 63/1027
24/16 PB
11,685,581 B2 * 6/2023 King .................. B65D 63/1072
24/270
2003/0182766 A1 * 10/2003 Avinger ............. B65D 63/1027
24/16 PB
2005/0050691 A1 * 3/2005 Schroder ................. F16L 3/233
24/16 PB
2007/0084255 A1 * 4/2007 Otto ........................ E05B 75/00
70/16
2013/0014351 A1 * 1/2013 Kuglen .............. B65D 63/1027
24/17 B
2014/0318553 A1 * 10/2014 Wolfe ..................... E05B 75/00
128/878
2015/0176313 A1 * 6/2015 Hines ...................... E05B 75/00
70/16
2017/0107033 A1 * 4/2017 Cochran ............ B65D 63/1027
2022/0332485 A1 * 10/2022 Beckman ........... B65D 63/1027
2023/0192376 A1 * 6/2023 Lawrence ............... E05B 75/00
24/16 PB
2023/0193663 A1 * 6/2023 Lawrence .......... B65D 63/1027
70/15

FOREIGN PATENT DOCUMENTS

DE 202011050271 U1 * 10/2012 ......... B65D 63/1027
EP 0454571 A1 * 10/1991 ........... G09F 3/0352
FR 796222 A * 4/1936
GB 934958 A * 8/1963 ............. B65D 63/10
GB 2464699 A * 4/2010 ............. B65D 63/14
GB 2530773 A * 4/2016 ......... B65D 63/1027
GB 2519141 B * 5/2016 ............. B65D 63/10
JP 52049197 A * 4/1977 .............. F16L 3/233
JP 11292130 A * 10/1999 ......... B65D 63/1027
KR 20170091806 A * 8/2017 ......... B65D 63/1027
WO WO-2009043886 A1 * 4/2009 .............. A47J 43/18
WO WO-2014012178 A1 * 1/2014 ............ B60P 7/0823

* cited by examiner

SELF-LOCKING TIE CORDS AND SYSTEMS, AND RELATED METHODS OF USE

CROSS-REFERENCE

This application claims the benefit of U.S. Provisional Application No. 63/292,294, filed Dec. 21, 2021 which is hereby incorporated herein by reference.

TECHNICAL FIELD

This invention relates generally to the field of ties and tie cords. More specifically, the invention discloses new and useful self-locking tie cords and self-locking tie cord systems, and related methods of use.

BACKGROUND

Many different types of ties and tie cords have been developed for many different applications. For example, Velcro cable ties have made organizing pesky electronic cables simple; twist ties (e.g., a metal wire encased in a thin strip of paper or plastic) have made sealing and resealing bags easier than tying knots; and zip ties have been applied to innumerable purposes, with versatility rivaling that of duct tape. Few of these ties and tie cords, however, have been designed and developed for use on human beings, and even fewer have been designed and developed for pleasure. Current implements for pleasurable detainment are elaborate and designed for specific, limited applications (e.g., harnesses), versatile but labor intensive (e.g., standard ropes), or uncomfortable and intimidating (e.g., handcuffs).

SUMMARY

While it will be understood that the apparatuses and systems of the present invention may be useful for many different applications and in many different environments, disclosed herein are self-locking tie cords and self-locking tie cord systems designed and developed for the pleasurable detainment of human beings.

In one aspect, disclosed herein is a self-locking tie cord comprising: a) a linear series of a plurality of nodules coupled together by a connective stem; b) a planar lock coupled to one end of the connective stem and comprising a valve configured to allow the nodules to pass through the planar lock in only a first direction orthogonal to the plane of the planar lock; and c) an unlocking mechanism disposed within the planar lock and configured to unlock the valve when activated, such that the nodules are allowed to pass through the planar lock in both the first direction orthogonal to the plane of the planar lock and a second direction orthogonal to the plane of the planar lock and opposite to the first direction orthogonal to the plane of the planar lock. In some embodiments, the nodules comprise a circular cross section orthogonal to the central axis of the connective stem. In some embodiments, the planar lock comprises a circular opening along the plane of the planar lock. In some embodiments, the nodules are geometrically identical and the circular opening of the planar lock comprises a diameter larger than the circular cross section of the nodules. In some embodiments, the valve is disposed within the circular opening of the planar lock. In some embodiments, the nodules are spherical. In some embodiments, the nodules are disks. In some embodiments, the nodules are rings. In some embodiments, the connective stem is flexible in only one direction. In some embodiments, the connective stem is flexible in all directions. In some embodiments, the connective stem is a string. In some embodiments, the connective stem is a tube. In some embodiments, the tube comprises a flexible material. In some embodiments, the connective stem comprises a semi-flexible material, such that the shape of the connective stem may be readily reformed but maintains itself at rest. In some embodiments, the unlocking mechanism is manually activated. In some embodiments, the unlocking mechanism is digitally activated. In some embodiments, the planar lock further comprises a receptacle configured to receive an unlocking key configured to activate the unlocking mechanism when received by the receptacle. In some embodiments, the self-locking tie cord further comprises a drawstring or a pull tab coupled to the end of the connective stem opposite the planar lock.

In another aspect, disclosed herein is a self-locking tie cord system comprising: a) a linear series of a plurality of nodules coupled together by a connective stem; b) a planar lock coupled to one end of the connective stem and comprising a valve configured to allow the nodules to pass through the planar lock in only a first direction orthogonal to the plane of the planar lock; c) an unlocking mechanism disposed within the planar lock and configured to unlock the valve when activated, such that the nodules are allowed to pass through the planar lock in both the first direction orthogonal to the plane of the planar lock and a second direction orthogonal to the plane of the planar lock and opposite to the first direction orthogonal to the plane of the planar lock; and d) an unlocking key configured to activate the unlocking mechanism. In some embodiments, the unlocking key is disposed within a ring configured to be worn on a finger. In some embodiments, the planar lock further comprises a receptacle configured to receive the unlocking key. In some embodiments, the unlocking key is configured to activate the unlocking mechanism when joined with the receptacle. In some embodiments, the unlocking key comprises a wireless signal and the receptacle is configured to receive the wireless signal. In some embodiments, the wireless signal is a Bluetooth signal. In some embodiments, the nodules have a circular cross section orthogonal to the central axis of them connective stem. In some embodiments, the planar lock comprises a circular opening along the plane of the planar lock. In some embodiments, the nodules are geometrically identical and the circular opening of the planar lock comprises a diameter larger than the circular cross section of the nodules. In some embodiments, the valve is disposed within the circular opening of the planar lock. In some embodiments, the nodules are spherical. In some embodiments, the nodules are disks. In some embodiments, the nodules are rings. In some embodiments, the connective stem is flexible only in a single direction. In some embodiments, the connective stem is flexible in all directions. In some embodiments, the connective stem is a string. In some embodiments, the connective stem is a tube. In some embodiments, the tube comprises a flexible material. In some embodiments, the connective stem comprises a semi-flexible material, such that the shape of the connective stem may be readily reformed but maintains itself at rest. In some embodiments, the unlocking mechanism is manually activated. In some embodiments, the unlocking mechanism is digitally activated. In some embodiments, the system further comprises a drawstring or a pull tab coupled to the end of the connective stem opposite the planar lock.

In another aspect, disclosed herein is a self-locking tie cord apparatus comprising: a) a linear series of nodules coupled together by a connective stem; and b) a lock, coupled to a first end of the connective stem, comprising a planar opening and one or more flexible tabs disposed within the planar opening configured to limit the shape of the planar opening such that the shape of the planar opening prevents the nodules from passing through the planar opening when the one or more flexible tabs are at rest, wherein the lock is configured to allow a nodule from the series of nodules to pass through the planar opening in a first direction orthogonal to the planar opening or a second direction orthogonal to the planar opening and opposite to the first direction when the nodule applies a force to the one or more flexible tabs in the first or second direction sufficient enough to flex the one or more flexible tabs such that the shape of the planar opening allows the nodule to pass through the planar opening. In some embodiments, the nodules are geometrically identical. In some embodiments, the nodules are ovoidal. In some embodiments, the nodules are spherical. In some embodiments, the nodules, the connective stem, the lock, and the one or more flexible tabs disposed within the planar opening of the lock all comprise a single continuous piece of material. In some embodiments, the single continuous piece of material is comprised of silicone rubber. In some embodiments, the single continuous piece of material is comprised of hard plastic. In some embodiments, the apparatus further comprises a pull tab coupled to a second end of the connective stem opposite the first end of the connective stem, wherein the pull tab is configured to pass through the shape of the planar opening unobstructed when the one or more flexible tabs are at rest. In some embodiments, the nodules, the connective stem, the lock, the one or more flexible tabs disposed within the planar opening of the lock, and the pull tab all comprise a single continuous piece of material. In some embodiments, the nodules, the connective stem, the lock, and the one or more flexible tabs disposed within the planar opening of the lock all comprise a single continuous piece of material, and the pull tab comprises a separate piece of material. In some embodiments, the planar opening and the one or more flexible tabs disposed within the planar opening comprise a line of symmetry perpendicular to a central axis of the connective stem. In some embodiments, the planar opening and the one or more flexible tabs disposed within the planar opening comprise a line of symmetry parallel to a central axis of the connective stem. In some embodiments, the apparatus further comprises a clip coupled to the lock and configured to receive and secure in-place the connective stem. In some embodiments, the one or more flexible tabs disposed within the planar opening of the lock form an implied circle within the planar opening. In some embodiments, the nodules are geometrically identical and comprise circular cross-sections orthogonal to the connective stem and wherein the diameter of the implied circle formed by the one or more flexible tabs disposed within the planar opening of the lock is smaller than the diameter of the largest circular cross-section of the nodules. In some embodiments, a nodule must apply a force of at least 250 pounds per square inch (PSI) to the one or more flexible tabs disposed within the planar opening in order to pass through the planar opening. In some embodiments, wherein a nodule must apply a force of at least 500 PSI to the one or more flexible tabs disposed within the planar opening in order to pass through the planar opening. In some embodiments, the planar opening is circular. In some embodiments, the planar opening is ovular. In some embodiments, the force applied by the nodule to the one or more flexible tabs required to allow the nodule to pass through the planar opening in the first direction is less than the force applied by the nodule to the one or more flexible tabs required to allow the nodule to pass through the planar opening in the second direction.

In another aspect, disclosed herein is a self-locking tie cord apparatus comprising: a) a linear series of nodules coupled together by a connective stem; and b) a lock, coupled to one end of the connective stem, comprising a planar opening and configured to allow a nodule from the series of nodules to pass through the planar opening in a first direction orthogonal to the planar opening or a second direction orthogonal to the planar opening and opposite to the first direction only when the nodule applies a sufficient force to the planar opening.

In another aspect, disclosed herein is a self-locking tie cord apparatus comprising: a) a linear series of nodules coupled together by a connective stem; and b) a lock coupled to a first end of the connective stem and comprising a planar opening, wherein the self-locking tie cord is configured to exist in a plurality of states comprising: i) an open state, wherein no nodules have been passed through the planar opening of the lock; and ii) a locked state, wherein one or more nodules have been passed through the planar opening the of the lock and wherein the lock is trapped within a potential well between two successive nodules. In some embodiments, the nodules, the connective stem, and the lock all comprise a single continuous piece of material. In some embodiments, the single continuous piece of material is comprised of silicone rubber. In some embodiments, the lock, when the self-locking tie cord exists in the locked state, can escape the potential well by moving a first direction along a central axis of the connective stem and by moving in a second direction along the central axis of the connective stem and opposite to the first direction. In some embodiments, the force required for the lock to escape the potential well by moving in the first direction is less than the force required for the lock to escape the potential well by moving in the second direction. In some embodiments, the lock further comprises one or more flexible tabs disposed within the planar opening and configured to limit the shape of the planar opening such that the shape of the planar opening prevents the nodules from passing through the planar opening when the one or more flexible tabs are at rest and wherein the lock is configured to escape the potential well between the two successive nodes only when one of the two successive nodes applies a force to the one or more flexible tabs sufficient enough to flex the one or more flexible tabs such that the shape of the planar opening allows the nodule to pass through the planar opening. In some embodiments, the nodules, the connective stem, the lock, and the one or more flexible tabs disposed within the planar opening of the lock all comprise a single continuous piece of material. In some embodiments, the nodule must apply a force equivalent of at least 250 pounds per square inch (PSI) to the one or more flexible tabs disposed within the planar opening in order to pass through the planar opening. In some embodiments, the one or more flexible tabs disposed within the planar opening of the lock form an implied circle within the planar opening when the one or more flexible tabs are at rest. In some embodiments, the nodules are geometrically identical and comprise circular cross-sections orthogonal to the connective stem and wherein the diameter of the implied circle formed by the one or more flexible tables disposed within the planar opening of the lock is smaller than the diameter of the largest circular cross-section of the nodules. In some embodiments, the apparatus further comprises a clip coupled to the lock and the plurality of states further comprises a clipped state, wherein the clip has received and secured in-place the connective stem. In some embodiments, the nodules are geometrically identical. In some embodiments, the nodules are ovoidal. In some embodiments, the nodules are spherical. In some embodiments, the apparatus further comprises a pull tab coupled to a second end of the connective stem opposite the first end of the connective stem, wherein the pull tab is configured to pass through the shape of the planar opening unobstructed when the one or more flexible tabs are at rest. In some embodiments, the nodules, the connective stem, the lock, the one or more flexible tabs disposed within the planar opening of the lock, and the pull tab all comprise a single continuous piece of material. In some embodiments, the planar opening and the one or more flexible tabs disposed within the planar opening comprise a line of symmetry perpendicular to a central axis of the connective stem. In some embodiments, the planar opening and the one or more flexible tabs disposed within the planar opening comprise a line of symmetry parallel to a central axis of the connective stem. In some embodiments, the planar opening is circular. In some embodiments, the planar opening is ovular.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE DRAWINGS

Numerous embodiments of the invention will now be described in detail with reference to the accompanying figures. The following description of the embodiments of the invention is not intended to limit the invention to these embodiments but rather to enable a person skilled in the art to make and use this invention. Variations, configurations, implementations, and applications described herein are optional and not exclusive to the variations, configurations, implementations, and applications that they describe. The invention described herein can include any and all permutations of these variations, configurations, implementations, and applications.

In the following description, numerous specific details are set forth in order to provide a thorough understanding of the invention. It will be apparent, however, to one skilled in the art that the invention can be practiced without these specific details.

Reference in this specification to “one embodiment” or “an embodiment” or “some embodiments” means that a particular feature, structure, or characteristic described in connection with the embodiment(s) is included in at least one embodiment of the invention. The appearances of the phrase “in one embodiment” or “in some embodiments” in various places in this specification are not necessarily all referring to the same embodiment(s), nor are separate or alternative embodiments mutually exclusive of other embodiments. Moreover, various features are described which may be exhibited by some embodiments and not by others. Similarly, various requirements are described which may be requirements for some embodiments but no other embodiments.

Self-Locking Tie Cord

Figure 1A:
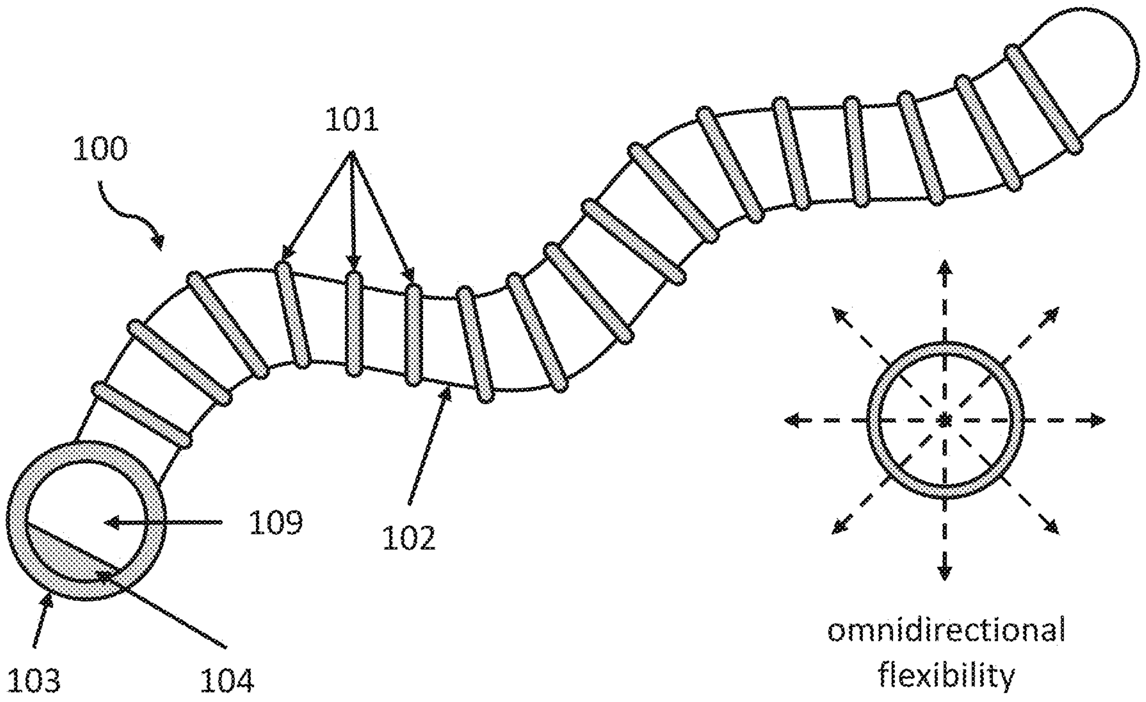
FIG. 1A illustrates an exemplary embodiment of a self-locking tie cord.
Figure 1B:
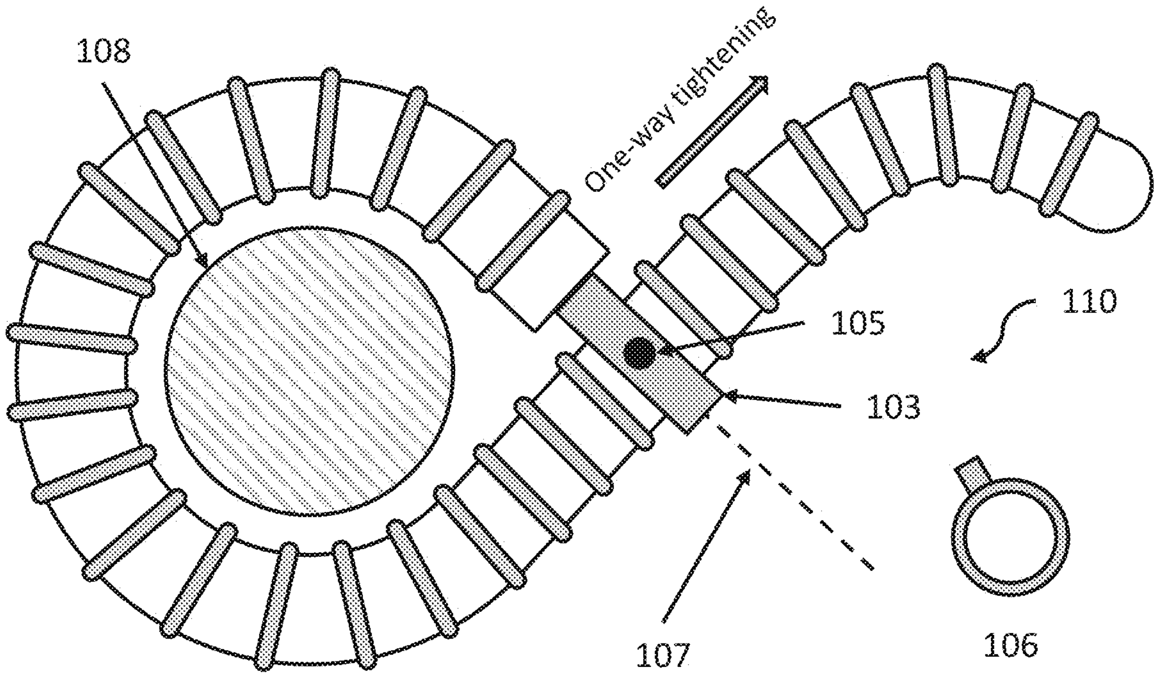
FIG. 1B illustrates an exemplary embodiment of a self-locking tie cord system.

As mentioned above, disclosed herein are self-locking tie cords and self-locking tie cord systems designed and developed for the pleasurable detainment of human beings. FIGS. 1A & 1B illustrate an exemplary embodiment of a self-locking tie cord. In the example illustrated in FIG. 1A, the self-locking tie cord 100 is in an unlocked position (i.e., the connective stem of the self-locking tie cord has not been pulled through the lock of the self-locking tie cord, as will be described in greater detail below). In some embodiments, as illustrated in FIG. 1A, a self-locking tie cord 100 includes a plurality of nodules 101 that are coupled together by a connective stem 102. In some embodiments, as illustrated in FIG. 1A, the plurality of nodules 101 are coupled together by the connective stem 102 in a linear series. In some embodiments, the nodules 101 are geometrically identical. In general, a self-locking tie cord 100 may include any number of nodules 101, and the connective stem 102 may be any length. In some embodiments, the nodules 101 are evenly spaced along the connective stem 102. In some embodiments, the nodules 101 are fixed in their positions along the connective stem 102. Generally, the longer the connective stem 102 of a self-locking tie cord 100 is, the more nodules 101 that the self-locking tie cord 100 will include. Furthermore, the longer the connective stem 102 of a self-locking tie cord 100 is, the greater the cross-sectional area 108 that the self-locking tie cord 100 will be able to tie around, as illustrated in FIG. 1B.

FIG. 1B illustrates an exemplary embodiment of a self-locking tie cord in a locked position. In some embodiments, as illustrated in FIGS. 1A & 1B, the self-locking tied cord 100 includes a lock 103 that can be used to put the self-locking tie cord 100 into a locked position. In some embodiments, the lock 103 is coupled to one end of the connective stem 102 of the self-locking tie cord 100. In some embodiments, the lock 103 is a planar lock. In some embodiments, a planar lock is a lock that includes a planar opening through which nodules 101 may pass in one or more directions. In some embodiments, a planar lock is a lock that, when locked, has a planar opening 109 through which nodules 101 may pass in only one direction orthogonal to the plane 107 of the planar opening 109. In some embodiments, the planar lock allows nodules 101 to pass through the planar opening 109 in only one direction by employing a valve 104 (e.g., a one-way valve) that is included in the planar opening 109, as illustrated in FIG. 1A. As illustrated by FIG. 1B, when the lock 103 is a planar lock coupled to one end of the connective stem 102 of the self-locking tie cord 100, and one or more nodules 101 coupled together by the connective stem 102 are passed through the planar lock, a cross-sectional area 108 is enclosed by the self-locking tie cord 100. In such an embodiment, because the planar lock allows the nodules 101 to pass through the lock 103 in only one direction, until the nodules 101 are allowed to pass back through the lock 103 (e.g., when the lock 103 is unlocked, as described below), the cross-sectional area 108 enclosed by the self-locking tie cord 100 cannot be released, and can only be tightened (i.e., by feeding more nodules 101 through the lock 103). Thus, as soon as a single nodule 101 of a self-locking tie cord 100 is passed through the planar lock, the self-locking tie cord 100 is effectively locked. In this way, the self-locking tie cord 100 can be used to bind together anything placed within the cross-sectional area 108.

In some embodiments, the lock 103 includes an unlocking mechanism that can be activated to unlock the self-locking tie cord 100 when the self-locking tie cord 100 has been put into a locked position (e.g., when the lock 103 is a planar lock coupled to one end of the connective stem 102 and one or more nodules 101 coupled together in series by the connective stem 102 are passed through the planar lock, as described above). For example, in some embodiments, the unlocking mechanism is a latch or a switch or a button that can be pressed, pulled, flipped, or otherwise undone to release the valve 104 included in the planar opening 109 of a planar lock (as described above), such that the nodules 101 of the self-locking tie cord 100 are then allowed to pass through the planar opening 109 in two directions: a first direction orthogonal to the plane 107 of the planar opening 109 (e.g., a locking and tightening direction, in which passing the nodules 101 through the planar lock effectively locks the self-locking tie cord 100 or contracts the cross-sectional area 108 enclosed by the self-locking tie cord 100) and a second direction orthogonal to the plane 107 of the planar opening 109 and opposite to the first direction orthogonal to the plane 107 of the planar opening 109 (e.g., a loosening and unlocking direction, in which passing the nodules 101 through the planar lock expands the cross-sectional area 108 or unlocks the self-locking tie cord 100). In some embodiments, the unlocking mechanism is manually activated. In some embodiments, the unlocking mechanism is digitally activated. In some embodiments, the unlocking mechanism can be activated only when paired or coupled with an unlocking key 106, as described below. In some embodiments, the lock 103 includes a receptacle 105 that can receive the unlocking key 106.

A self-locking tie cord 100 may be constructed in many different forms. In some embodiments, as in the example illustrated by FIGS. 1A & 1B, the nodules 101 of the self-locking tie cord 100 are disks or rings, and the connective stem 102 that couples the nodules 101 together is a flexible tube. In some embodiments, as in the example illustrated by FIGS. 2A & 2B, the nodules 201 are spherical, and the connective stem 202 that couples the nodules 201 together is a string. In both of these non-limiting examples, the nodules of both self-locking tie cords 100 and 200 have a circular cross section orthogonal to the central axis of their respective connective stems. Likewise, in both of these non-limiting examples, a planar lock is coupled to one end of the connective stems of both of self-locking tie cords 100 and 200. The planar opening of the planar lock is circular—to match the circular cross section of the nodules—with a diameter slightly larger than that of the circular cross section of the nodules. Thus, while self-locking tie cord 100 includes disk or ring shaped nodules 101 coupled together by a tubular connective stem 102 and self-locking tie cord 200 includes spherical nodules 201 coupled together by a string-like connective stem 202, lock 103 and lock 203 work in the exact same way, by allowing the circular cross sections of the nodules to pass through the planar opening of the planar lock in only one direction, until the unlocking mechanism is activated (as described above). In some embodiments, the connective stem of a self-locking tie cord is flexible in only one direction. In some embodiments, the connective stem of a self-locking tie cord is flexible in all directions. In some embodiments, the connective stem is semi-flexible (e.g., made of a semi-flexible material), such that the shape of the connective stem may be readily reformed but maintains itself at rest.

Self-Locking Tie Cord System

Figure 2A:
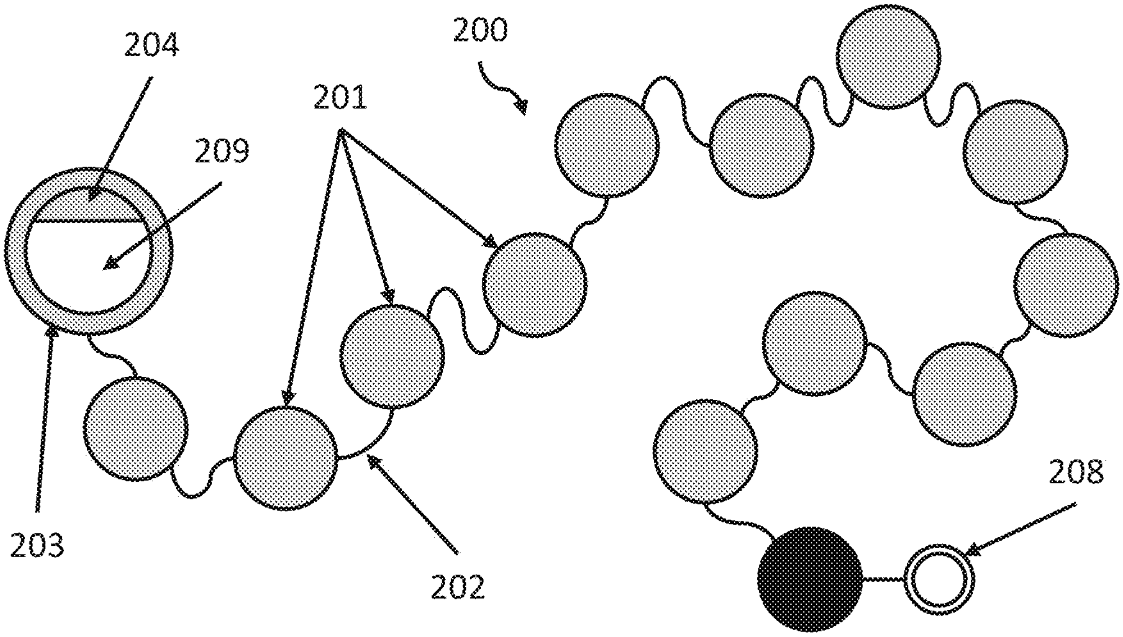
FIG. 2A illustrates an exemplary embodiment of a self-locking tied cord.
Figure 2B:
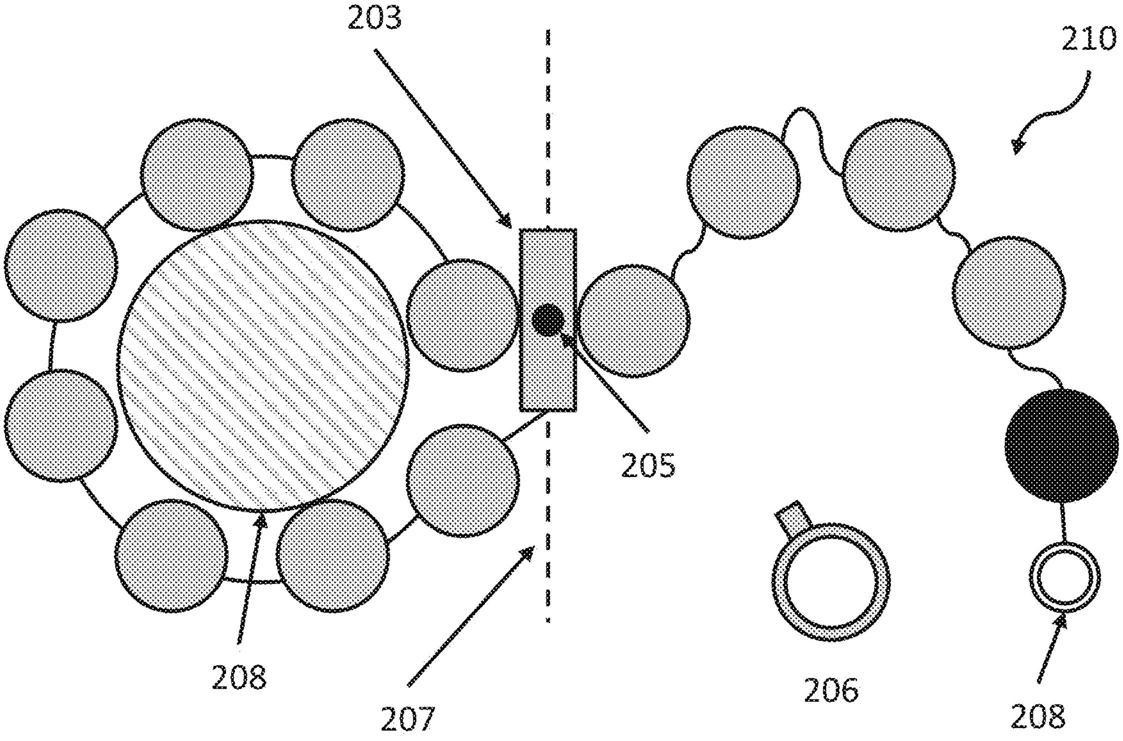
FIG. 2B illustrates an exemplary embodiment of a self-locking tie cord system

FIGS. 2A & 2B illustrate an exemplary embodiment of a self-locking tie cord system. As mentioned above, FIG. 2A illustrates an exemplary embodiment of a self-locking tie cord 200. As described above, in some embodiments, the self-locking tie cord 200 includes one or more nodules 201 coupled together by a connective stem 202 and a lock 203. In some embodiments, the lock 203 is a planar lock that has a planar opening 209 through which nodules 201 may pass in only one direction orthogonal to the plane 207 of the planar opening 209 (as illustrated by FIG. 2B). In some embodiments, the planar lock allows nodules 201 to pass through the planar opening 209 in only one direction by employing a valve 204 (e.g., a one-way valve) that is included in the planar opening 209. In some embodiments, the self-locking tie cord 200 includes a drawstring or a pull tab 208 coupled to the end of the connective stem 202 opposite the lock 203 to assist a user of the self-locking tie cord 200 in pulling the nodules 201 through the lock 203. In some embodiments, as described above, the lock 203 includes an unlocking mechanism that can be activated to unlock the self-locking tie cord 200 when the self-locking tie cord 200 has been put into a locked position (e.g., when the lock 203 is a planar lock coupled to one end of the connective stem 202 and one or more nodules 201 coupled together in series by the connective stem 202 are passed through the planar lock, as illustrated by FIG. 2B). In some embodiments, the unlocking mechanism can be activated only when paired or coupled with an unlocking key 206, as described below.

FIG. 2B illustrates an exemplary embodiment of a self-locking tie cord system 210. In some embodiments, the self-locking tie cord system 210 includes a self-locking tie cord 200 (as described above) and an unlocking key 206. As mentioned above, in some embodiments, the self-locking tie cord 200 includes an unlocking mechanism that can be activated to unlock the self-locking tie cord 200 when the self-locking tie cord 200 has been put into a locked position. For example, in some embodiments, the unlocking mechanism is a latch or a switch or a button that can be pressed, pulled, flipped, or otherwise undone to release a valve 204 included in the planar opening 209 of a planar lock (as illustrated in FIG. 2A), such that the nodules 201 of the self-locking tie cord 200 are then allowed to pass through the planar opening 209 in two directions: a first direction orthogonal to the plane 207 of the planar opening 209 (e.g., a locking and tightening direction, in which passing the nodules 201 through the planar lock locks the self-locking tie cord 200 or contracts the cross-sectional area 208 enclosed by the self-locking tie cord 200) and a second direction orthogonal to the plane 207 of the planar opening 209 and opposite to the first direction orthogonal to the plane 207 of the planar opening 209 (e.g., a loosening and unlocking direction, in which passing the nodules 201 through the planar lock expands the cross-sectional area 208 or unlocks the self-locking tie cord 200).

As mentioned above, in some embodiments, the unlocking mechanism can be activated only when paired or coupled with an unlocking key 206. For example, in some embodiments, the lock 203 includes a receptacle 205 that can receive the unlocking key 206. In some embodiments, the unlocking key 206 automatically activates the unlocking mechanism when the unlocking key 206 is received by the receptacle 205. For example, in some embodiments, the receptacle 205 is a keyhole in the side of the lock 203 and the unlocking key 206 is a physical key that can be inserted into the keyhole. In this example, the unlocking mechanism is spring-loaded latch inside of the lock 203 that is released when the physical key is inserted into the keyhole. Or, for example, in some embodiments, the receptacle 205 is a wireless communication component that can receive wireless signals (e.g., Bluetooth signals) and the unlocking key 206 is a wireless signal. In this example, the unlocking mechanism is a dead bolt that is withdrawn when the wireless communication component receives the wireless signal (e.g., the wireless signal is transmitted to the wireless communication component by an electronic device, such as a mobile phone). In some embodiments, a user of the self-locking tie cord 200 can use the unlocking key 206 to activate the unlocking mechanism after the unlocking key 206 is received by the receptacle 205. For example, in some embodiments, the receptacle 205 is a keyhole and the unlocking key 206 is a physical key that can be inserted into the keyhole. In this example, the unlocking mechanism is a dead bolt that is withdrawn when the physical key is inserted into the keyhole and then turned in a counterclockwise direction. In some embodiments, when the unlocking key 206 is a physical key, the physical key is built into or otherwise coupled to a ring designed to be worn on a finger. However, the receptacle 205, the unlocking key 206, and the unlocking mechanism may take on any suitable form.

One-Piece Self-Locking Tie Cord

As mentioned above, in various embodiments, disclosed herein is a self-locking tie cord apparatus that can be used to bind objects placed within a cross-sectional area enclosed by the apparatus (e.g., cross-sectional area 108, as depicted in FIG. 1B). In some embodiments, as mentioned above, a self-locking tie cord includes one or more nodules coupled together by a connective stem and a lock coupled to one end of the connective stem that the one or more nodules can be passed through in both a first direction (e.g., a locking and tightening direction, as described above) and a second direction opposite the first direction (e.g., a loosening and unlocking direction, as described above). In some embodiments, some or all of the components of a self-locking tie cord (e.g., the nodules, the connective stem, and the lock) can be constructed in the form of a single continuous piece of material.

Figure 3A:
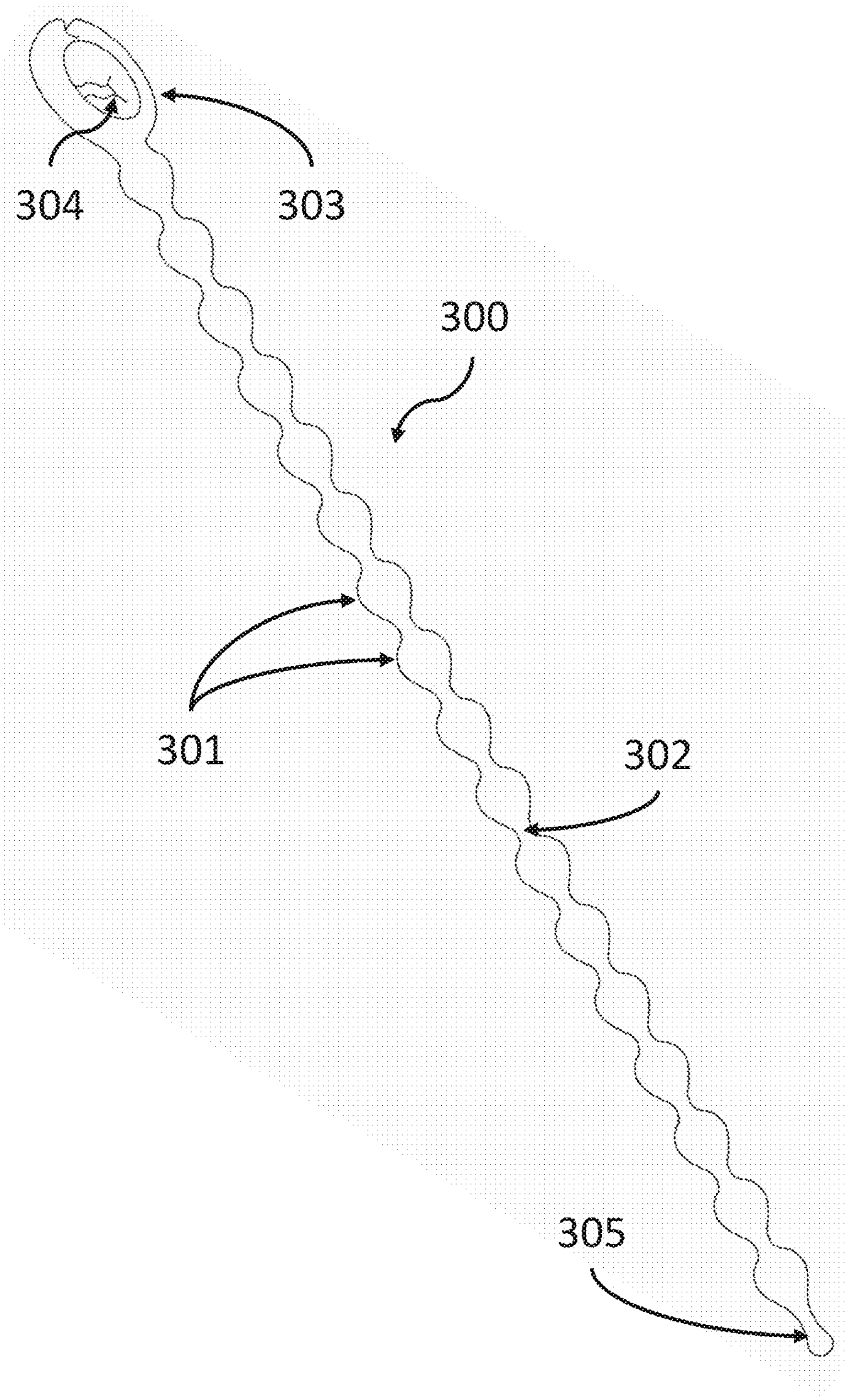
FIGS. 3A, 3B, and 3C illustrate exemplary embodiments of a self-locking tie cord.
Figure 3B:
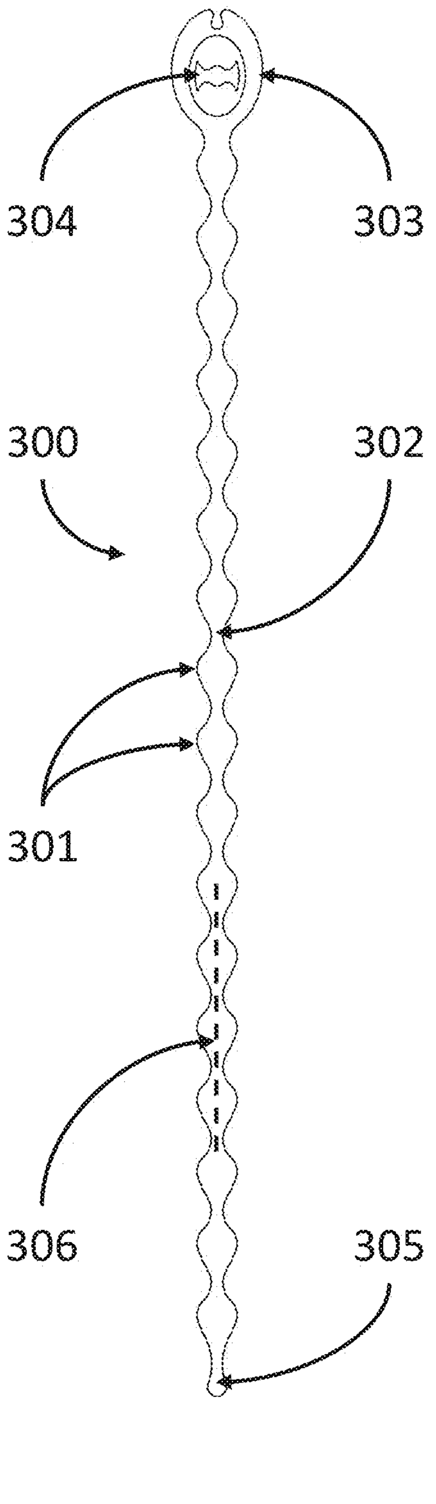
Figure 3C:
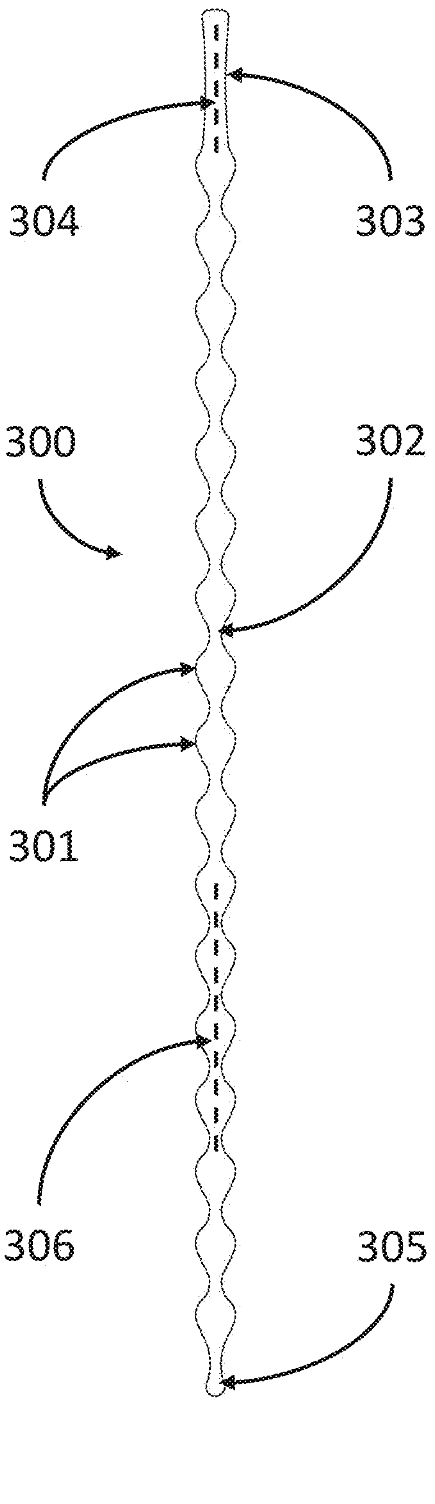

FIGS. 3A, 3B, and 3C illustrate an exemplary embodiment of a one-piece self-locking tie cord. In the example illustrated in FIGS. 3A, 3B, and 3C, a one-piece self-locking tie cord 300 includes a plurality of nodules 301 coupled together by a connective stem 302, and a lock 303 coupled to one end of the connective stem 302. In some embodiments, as illustrated in FIGS. 3A, 3B, and 3C, a one-piece self-locking tie cord 300 additionally includes a pull tab 305, as described below. In this example, the nodules 301, the connective stem 302, the lock 303, and the pull tab 305 are constructed in the form of a single continuous piece of material. For example, self-locking tie cord 300 may be a single piece of silicone rubber cast in a single mold. Or for example, self-locking tie cord 300 may be a single piece of 3D printed hard plastic. However, a one-piece self-locking tie cord 300 may be made of any other suitable material. In the example illustrated in FIGS. 3A, 3B, and 3C, the nodules 301 of one-piece self-locking tie cord 300 are geometrically identical ovoids that share a central axis with the connective stem 302, with the longer half of the ovoid pointing away from the lock 303. However, the nodules 301 of a one-piece self-locking tire cord 300 may be any other shape. For example, in some embodiments, the nodules 301 of a one-piece self-locking tie cord 300 are spherical. In some embodiments, the nodules 301 of a one-piece self-locking tie cord 300 are not geometrically identical. For example, in some embodiments, one half of the nodules 301 of a one-piece self-locking tie cord 300 are ovoidal and the other half of the nodules 301 of the one-piece self-locking tie cord 300 are spherical, with no two successive nodules 301 sharing the same shape.

Figure 4:
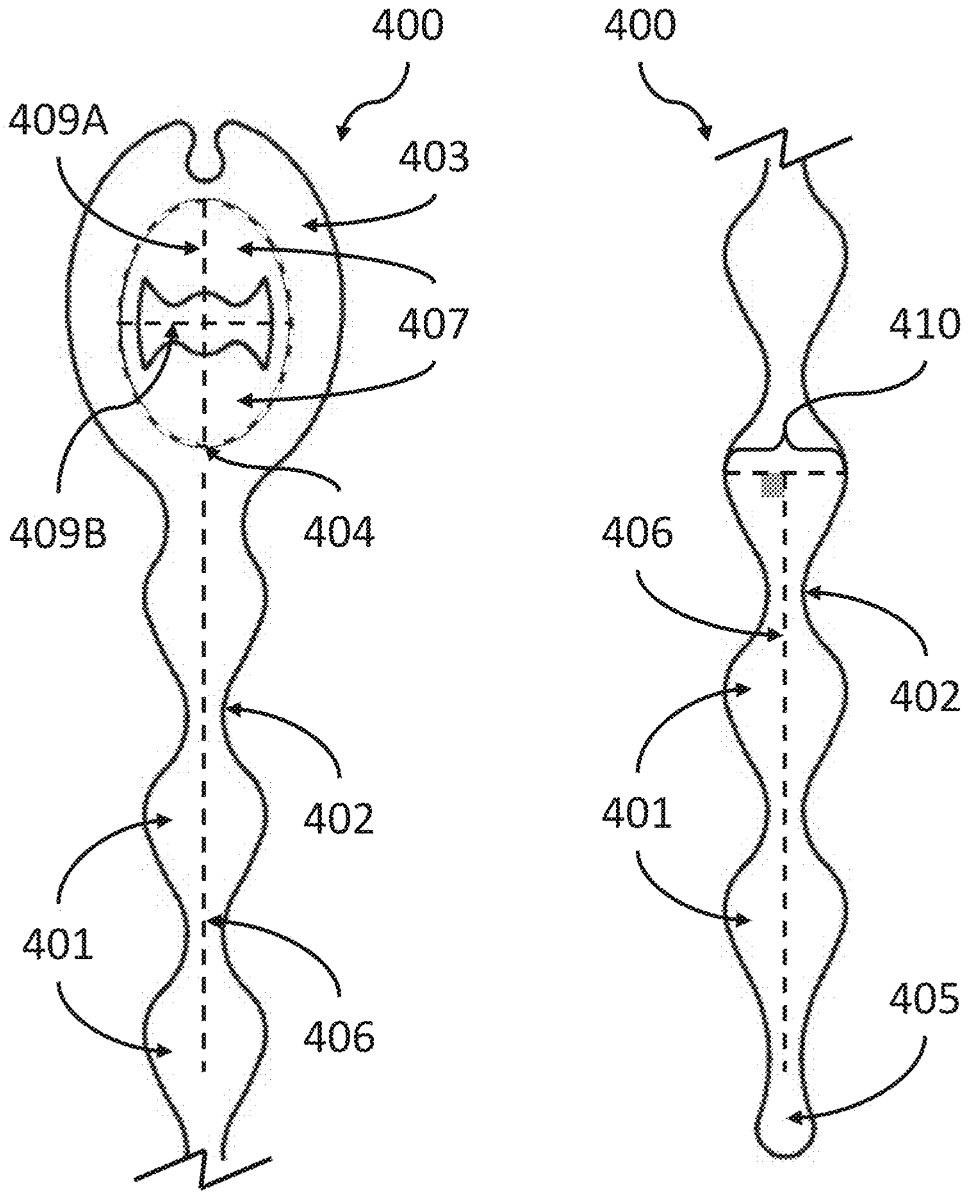
FIG. 4 illustrates an exemplary embodiment of a planar lock and a connective stem.

In some embodiments, as illustrated in FIG. 3B, the lock 303 of a one-piece self-locking tie cord 300 is a planar lock that includes a planar opening 304. When the one-piece self-locking tie cord 300 is rotated ninety degrees about the central axis 306 of the connective stem 302, from the face of the planar opening 304, as illustrated in FIG. 3C, the planar opening 304 is no longer visible. FIG. 4 illustrates an exemplary embodiment of a planar lock and a connective stem of a one-piece self-locking tie cord. In the example illustrated in FIG. 4, the lock 403 of the one-piece self-locking tie cord 400 is a planar lock that includes a planar opening 404 and two flexible tabs 407 disposed within the planar opening 404. In some embodiments, as in the example illustrated in FIG. 4, the planar opening 404 is ovular. In some embodiments, the planar opening 404 is circular. In some embodiments, as illustrated in FIG. 4, the planar opening 404 (and any flexible tabs 407 disposed within the planar opening 404) possesses a line of symmetry 409A parallel to the central axis 406 of the connective stem 402. In some embodiments, as illustrated in FIG. 4, the planar opening 404 (and any flexible tabs 407 disposed within the planar opening 404) possesses a line of symmetry 409B perpendicular to the central axis 406 of the connective stem 402.

In some embodiments, as illustrated in FIG. 4, the flexible tabs 407 disposed within the planar opening 404 limit the shape of the planar opening 404 such that the shape of the planar opening 404 prevents the nodules 401 of the one-piece self-locking tie cord 400 from passing through the planar opening 404 when the flexible tabs 407 are at rest. For example, in the example illustrated in FIG. 4, the two flexible tabs 407 disposed within the planar opening 404 form an implied circle in the center of the planar opening 404 with a diameter that is smaller than the diameter of the largest cross-section 410 of the nodules 401 orthogonal to the central axis 406 of the connective stem 402 (which, in this example, because the nodules 401 are ovoidal, is a circle as well). Thus, when the two flexible tabs 407 are at rest, the nodules 401 are prevented from passing through the implied circle formed by the two flexible tabs 407. However, because the flexible tabs 407 disposed within the planar opening 404 are flexible, a nodule 401 may pass through the planar opening 404 when the nodule 401 applies a force to the flexible tabs 407 sufficient enough to flex the flexible tabs 407 such that the shape of the planar opening 404 allows the nodule 401 to pass through. For example, in the example illustrated in FIG. 4, when the connective stem 402 is first pulled through the planar opening 404 of the lock 403, the first nodule 401 coupled to the connective stem 402 (i.e., the nodule 401 furthest along the connective stem 402 from the lock 403) applies a force to the two flexible tabs 407 that flexes the two flexible tabs 407 away from the nodule 401, thereby increasing the diameter of the implied circle formed by the two flexible tabs 407 at the center of the planar opening 404. As the force applied to the two flexible tabs 407 by the nodule 401 increases, the diameter of the implied circle formed by the two flexible tabs 407 increases, until the diameter of implied circle formed by the two flexible tabs 407 is larger than the diameter of the largest cross-section 410 of the nodule 401 orthogonal to the central axis 406 of the connective stem 402, at which point the nodule 401 will be allowed to pass through the planar opening 404. In some embodiments, a pull tab 405 is small enough to pass through the shape of the planar opening 404 unobstructed when the flexible tabs 407 disposed within the planar opening 404 are at rest. The pull tab 405 can then be used to pull the nodules 401 through the planar opening 404.

Figure 5:
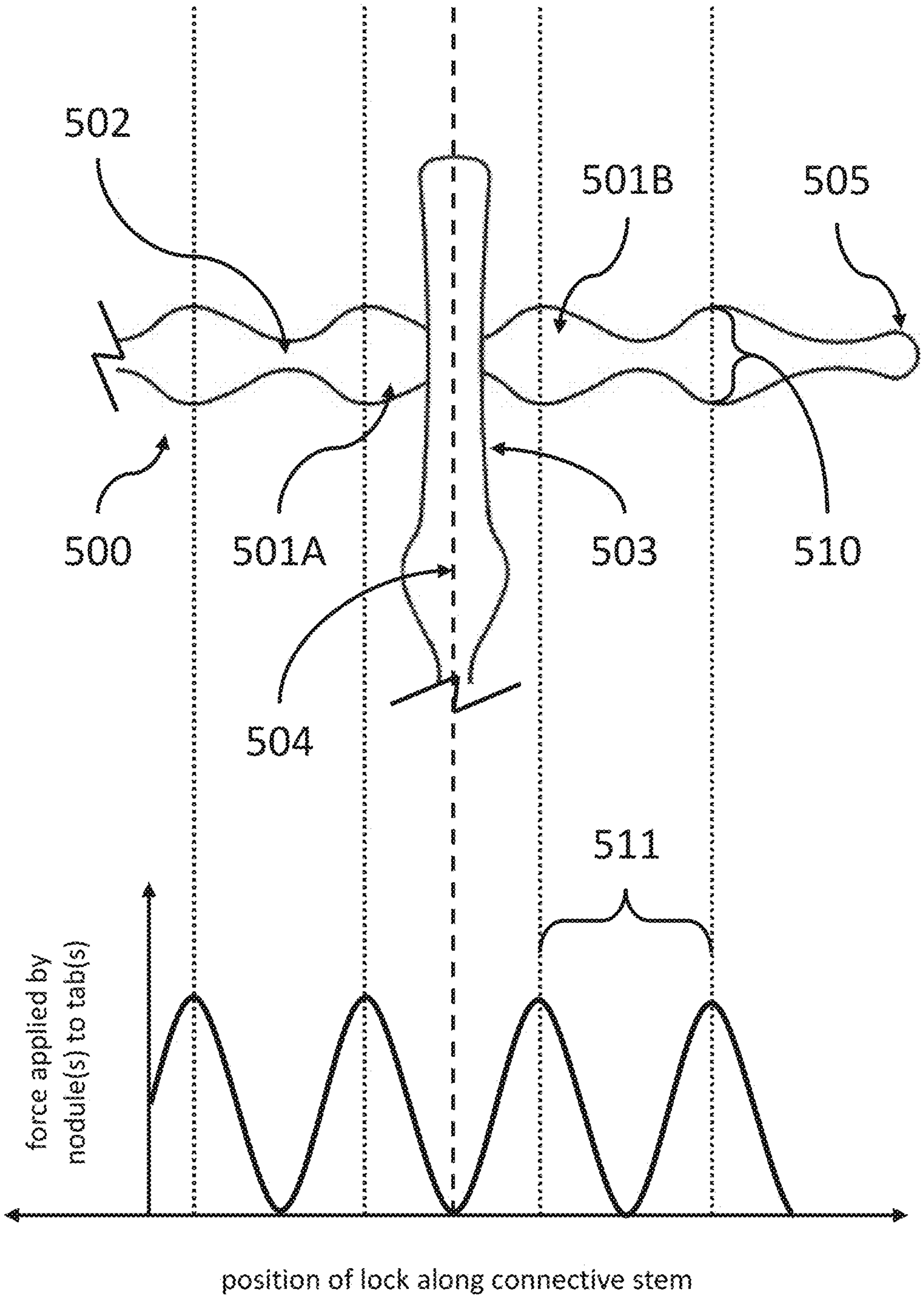
FIG. 5 depicts an exemplary diagram of a connective stem passing through a planar lock.

FIG. 5 depicts an exemplary diagram of a connective stem of a one-piece self-locking tie cord passing through a planar lock. In the example depicted by FIG. 5, the pull tab 505 and the first two nodules 501 (i.e., the two nodules 501 furthest along the connective stem 502 from the lock 503) have been passed through the planar opening 504 of the lock 503. Below the one-piece self-locking tie cord 500 is a graph depicting the force applied by one of the nodules 501 to one or more flexible tabs (e.g., flexible tabs 407, as described above) disposed within the planar opening 504 of the lock 503, as a function of the position of the lock 503 along the connective stem 502. In the current position of the lock 503, the flexible tabs disposed within the planar opening 504 of the lock 503 are not impacted by a nodule 501, and thus the force applied by one of the nodules 501 to the flexible tabs is zero. However, if the lock 503 is moved up the connective stem 502 (i.e., in the locking and tightening direction, as described above), the flexible tabs disposed within the planar opening 504 of the lock 503 will be impacted by nodule 501A, and the force applied by one of the nodules 501 (i.e., nodule 501A) will become non-zero. The further the lock 503 moves up the connective stem 502, the greater the force applied by nodule 501A will become, until the planar opening 504 of the lock 503 reaches the largest cross-section 510 of nodule 501A orthogonal to the connective stem 502. Likewise, if the lock 503 is moved down the connective stem 502 (i.e., in the loosening and unlocking direction, as described above), the flexible tabs disposed within the planar opening 504 of the lock 503 will be impacted by nodule 501B, and the force applied by one of the nodules 501 (i.e., nodule 501B) will become non-zero. The further the lock 503 moves down the connective stem 502, the greater the force applied by nodule 501B will become, until the planar opening 504 of the lock 503 reaches the largest cross-section 510 of nodule 501B orthogonal to the connective stem 502. Thus, in the current position of the lock 503, the lock 503 is trapped within a potential well 511 between the largest cross-sections 510 of nodules 501A and 501B.

When one or more nodules 501 have been passed through the planar opening 504 of the lock 503 and the lock 503 is trapped within a potential well 511 between two successive nodules 501, the one-piece self-locking tie cord 500 exists in a locked state, because the connective stem 502 cannot be withdrawn from the lock 503 until a sufficient force is applied to the flexible tabs disposed within the planar opening 504 of the lock 503 in the loosening and unlocking direction (as described above) by the first nodule 501 on the connective stem 502 (i.e., the nodule 501 furthest along the connective stem 502 from the lock 503). Because the one-piece self-locking tie cord 500 exists in a locked state as soon as a nodule 501 has been pass through the planar opening 504 of the lock 503, without any further action or equipment needed, the one-piece self-locking tie cord 500 is referred to as a "self-locking" tie cord. When no modules 501 have been passed through the planar opening 504 of the lock 503, the one-piece self-locking tie cord 500 exists in an unlocked state, because no cross-sectional area (as described above) is enclosed by the one-piece self-locking tie cord 500. In some embodiments, when the one-piece self-locking tie cord 500 exists in a locked state, the lock 503 can escape the potential well 511 between two successive nodules 501 by moving in a first direction (e.g., a locking and tightening direction, as described above) and by moving in a second direction opposite the first direction (e.g., a loosening and unlocking direction, as described above), as long as a sufficient force is applied by a nodule 501 to the planar opening 504 (e.g., to one or more flexible tabs disposed within the planar opening 504) of the lock 503 in the appropriate direction. In some embodiments, the force required for the lock 503 to escape the potential well 511 by moving in the first direction is less than the force required for the lock 503 to escape the potential well 511 by moving in the second direction, or vice versa. In some embodiments, a nodule 501 must apply a force equivalent of at least 250 pounds per square inch (PSI) to the flexible tab(s) disposed within the planar opening 504 of the lock 503 in order to pass through the planar opening 504. In some embodiments, a nodule 501 must apply a force equivalent of at least 500 PSI to the flexible tab(s) disposed within the planar opening 504 of the lock 503 in order to pass through the planar opening 504. In some embodiments, a nodule 501 must apply a force equivalent of at least 100, 200, 300, 400, 500, 600, 700, 800, 900, or 1000 PSI to the flexible tab(s) disposed within the planar opening 504 of the lock 503 in order to pass through the planar opening 504. However, a one-piece self-locking tie cord 500 may be configured such that any particular amount of force must be applied by a nodule 501 to the flexible tabs disposed within the planar opening 504 of the lock 503 in order for the nodule 501 to pass through the planar opening 504.

Figure 6A:
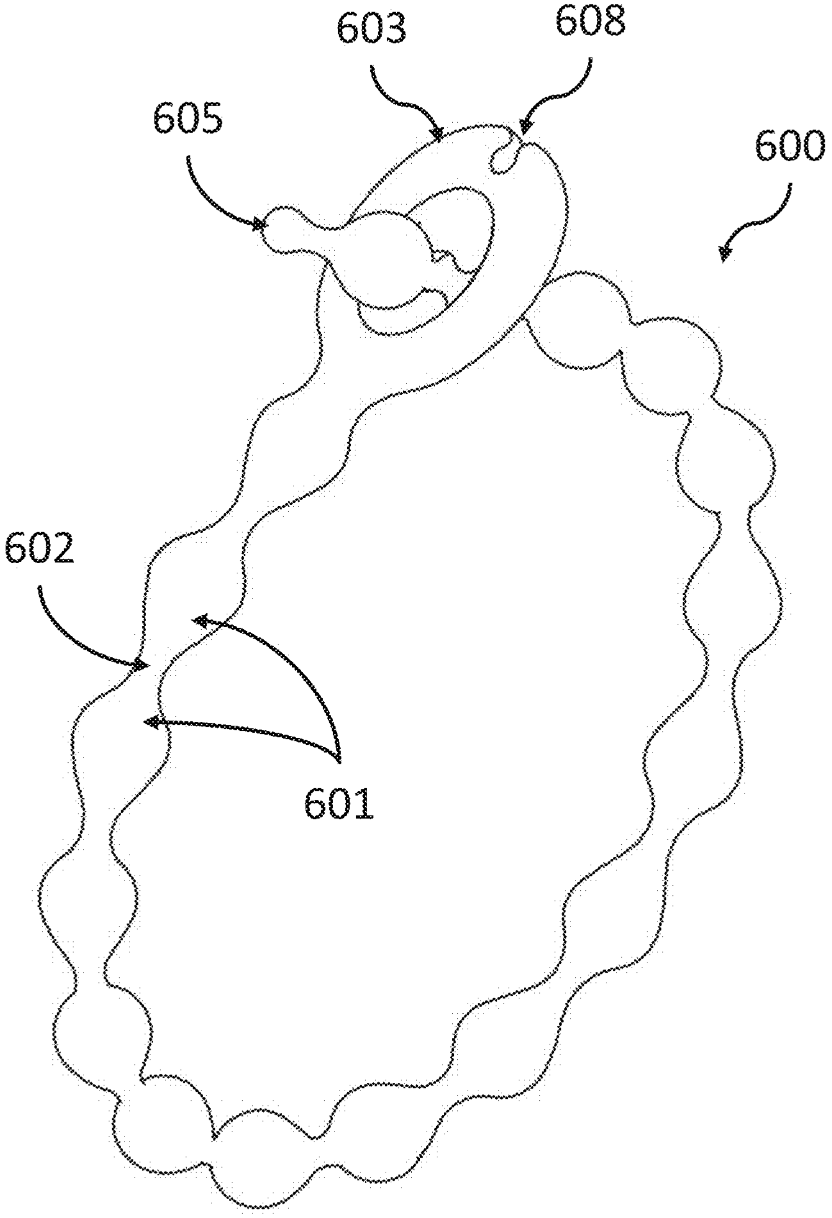
FIGS. 6A and 6B illustrate exemplary embodiments of a self-locking tie cord.
Figure 6B:
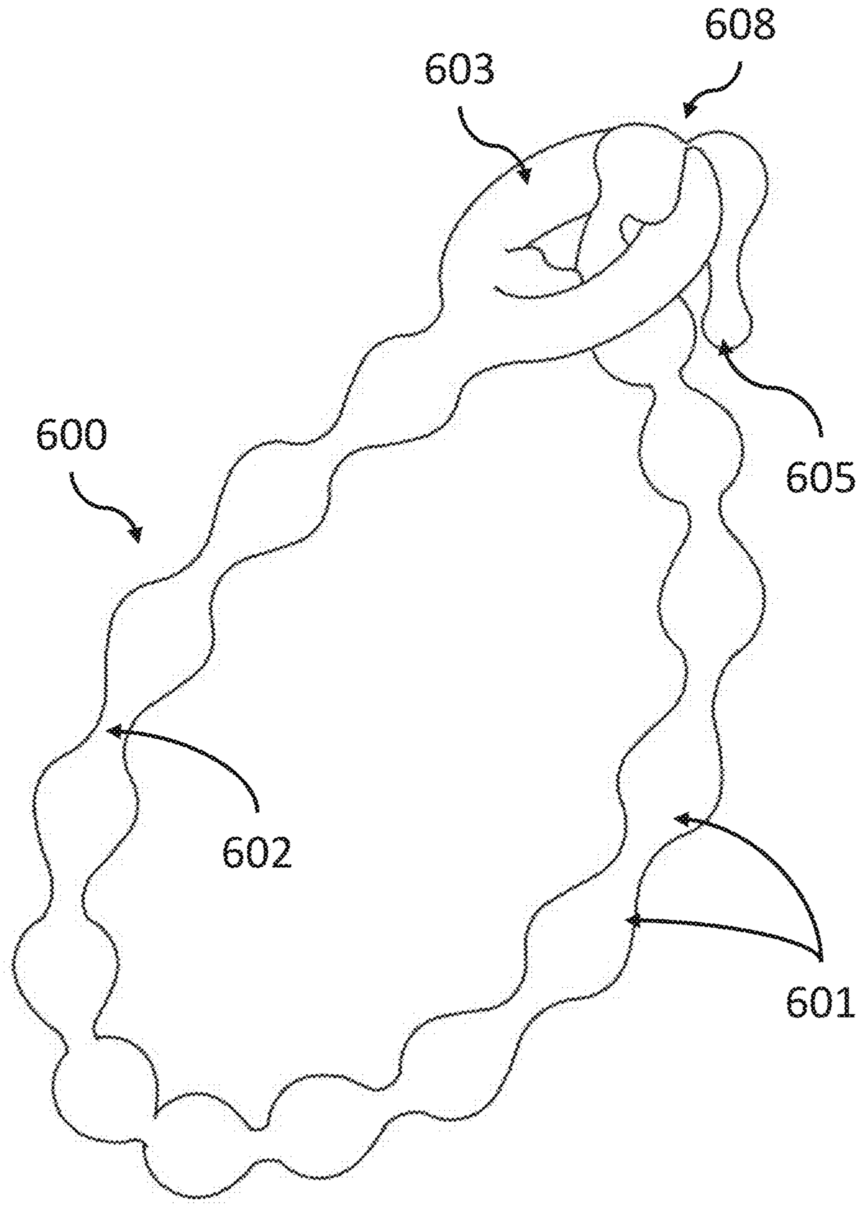

FIGS. 6A and 6B illustrate an exemplary embodiment of a one-piece self-locking tie cord. As mentioned above, in some embodiments, a one-piece self-locking tie cord 600 includes a plurality of nodules 601 coupled together by a connective stem 602 and a lock 603 coupled to one end of the connective stem 602, wherein the nodules 601, the connective stem 602, and the lock 603 are constructed in the form of a single continuous piece of material (e.g., a single piece of silicone rubber). As mentioned above, in some embodiments, a one-piece self-locking tie cord 600 additionally includes a pull tab 605, wherein the nodules 601, the connective stem 602, the lock 603, and the pull tab 605 are constructed in the form of a single continuous piece of material (e.g., a single piece of silicone rubber). In some embodiments, a one-piece self-locking tie cord 600 does not include any moving parts. In some embodiments, a one-piece self-locking tie cord 600 includes flexible parts (e.g., a flexible connective stem 602 or flexible tabs disposed within a planar opening of the lock 603, as described above), but does not include any moving parts. In some embodiments, as illustrated in FIG. 6A in 6B, a one-piece self-locking tie cord 600 additionally includes a clip 608 configured to receive and secure in-place the connective stem 602, as illustrated in FIG. 6B, wherein the pull tab 605 and the first nodule 601 (i.e., the nodule 601 furthest along the connective stem 602 from the lock 603) on the connective stem 602 have been passed through the lock 603 (placing the one-piece self-locking tie cord 600 in a locked state, as described above) and the connective stem 602 between the first and second nodules 601 (i.e., the two nodules 601 furthest along the connective stem 602 from the lock 603) has been inserted into the clip 608, where the connective stem 602 is now secured in-place. When the connective stem 602 has been received and secured in-place by the clip 608, the one-piece self-locking tie cord 600 exists in a clipped state. In some embodiments, as illustrated in FIGS. 6A and 6B, the clip 608 is coupled to the lock 603.

Applications of a Self-Locking Tie Cord or Self-Locking Tie Cord System

As mentioned above, disclosed herein are self-locking tie cords and self-locking tie cord systems designed and developed for the pleasurable detainment of human beings. During the course of many erotic activities, for example, a person often desires the ability to detain themself or another person for increased excitement or pleasure. As mentioned above, such detainment is often accomplished through the use of detaining implements such as harnesses, ropes, or handcuffs. However, each of these detaining implements have meaningful limitations: harnesses are often limited in their applications, and their use often requires lengthy and elaborate setups; ropes are more versatile but labor intensive, and their use often requires specific knot-tying knowledge and skill; and handcuffs are fast and effective but can often be uncomfortable or intimidating, and the cross-sectional area that they are capable of binding together is limited.

In contrast, the self-locking tie cords and self-locking tie cord systems described herein can be versatile, simple, quick, and comfortable all at once. For example, by placing both of a person's wrists inside of the cross-sectional area 108 and then pulling the connective stem 102 through the lock 103 (as illustrated in FIG. 1B), the person's hands and arms can be bound together by the self-locking tie cord 100 in one quick and simple motion. Such an application would be faster and simpler than tying a knot around the person's wrists with a rope. In another example, by placing both 1) a person's wrist and 2) a bedpost inside of the cross-sectional area 108 and then pulling the connective stem 102 through the lock 103 (as illustrated in FIG. 1B), the person's arm can be bound to the bedpost by the self-locking tie cord 100 in one quick and simple motion. Such an application would be faster and simpler than handcuffing the person's wrist first and then handcuffing the bedpost second. Furthermore, in this example, because the connective stem 102 is a flexible tube, the self-locking tie cord 100 would be more comfortable on the person's wrist than the sharp metallic edges of a pair of handcuffs. Further still, in this example, an unlocking key 106 included in the self-locking tie cord system 110 can be used similarly to a handcuff key to simulate and preserve dynamics of power and control. In yet another example, four self-locking tie cords could be used to bind each of a person's four principle members (i.e., their arms and legs) to four separate bedposts. Such an application would be faster and more versatile than the setup and use of bed restraint harnesses. However, a self-locking tie cord or self-locking tie cord system can be applied in any suitable way and in any suitable environment.

As a person skilled in the art will recognize from the previous detailed description and from the figures and claims, modifications and changes can be made to the embodiments of the invention without departing from the scope of this invention as disclosed here in the present application. It will be appreciated that, although the methods, processes, and functions of the present application have been recited in a particular series of steps, the individual steps of the methods, processes, and functions may be performed in any order, in any combination, or individually.

Embodiments are described at least in part herein with reference to flowchart illustrations and/or block diagrams of methods, systems, and computer program products and data structures according to embodiments of the disclosure. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

The aforementioned computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks. The computer program instructions may also be loaded onto a computer or other programmable data processing apparatus to cause a series of operational steps to be performed on the computer or other programmable apparatus, to produce a computer implemented process such that, the instructions which execute on the computer or other programmable apparatus provide steps for implementing the functions/acts specified in the block or blocks.

In general, the word "module" as used herein, refers to logic embodied in hardware or firmware, or to a collection of software instructions, written in a programming language, such as, Java, C, etc. One or more software instructions in the unit may be embedded in firmware. The modules described herein may be implemented as either software and/or hardware modules and may be stored in any type of non-transitory computer-readable medium or other non-transitory storage elements. Some non-limiting examples of non-transitory computer-readable media include CDs, DVDs, BLU-RAY, flash memory, and hard disk drives.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

What is claimed is:

1. A self-locking tie cord apparatus, comprising:

a linear series of asymmetric nodules coupled together by a connective stem, wherein each of the asymmetric nodules possesses an asymmetry across a nodule dividing line formed by the largest cross section of the nodule, the nodule dividing line being orthogonal to a central axis of the connective stem; and a lock, coupled to a first end of the connective stem, comprising a planar opening and one or more flexible tabs disposed within the planar opening configured to limit the shape of the planar opening such that the shape of the planar opening prevents the asymmetric nodules from passing through the planar opening when the one or more flexible tabs are at rest, wherein the lock is configured to allow an asymmetric nodule from the series of asymmetric nodules to pass through the planar opening in a first direction orthogonal to the planar opening when the asymmetric nodule applies a first required force to the one or more flexible tabs in the first direction and in a second direction orthogonal to the planar opening and opposite the first direction when the asymmetric nodule applies a second required force to the one or more flexible tabs in the second direction, wherein the first required force is sufficient to flex the one or more flexible tabs such that the shape of the planar opening allows the asymmetric nodule to pass through the planar opening in the first direction, wherein the second required force is sufficient to flex the one or more flexible tabs such that the shape of the planar opening allows the asymmetric nodule to pass through the planar opening in the second direction, and wherein the asymmetry of the asymmetric nodule causes the first required force to be less than the second required force.

2. The apparatus of claim 1, wherein the asymmetric nodules are geometrically identical.

3. The apparatus of claim 2, wherein the asymmetric nodules are ovoidal.

4. The apparatus of claim 1, wherein the asymmetric nodules, the connective stem, the lock, and the one or more flexible tabs disposed within the planar opening of the lock all comprise a single continuous piece of material.

5. The apparatus of claim 4, wherein the single continuous piece of material is comprised of silicone rubber.

6. The apparatus of claim 4, wherein the single continuous piece of material is comprised of hard plastic.

7. The apparatus of claim 1, further comprising a pull tab coupled to a second end of the connective stem opposite the first end of the connective stem, wherein the pull tab is configured to pass through the shape of the planar opening unobstructed when the one or more flexible tabs are at rest.

8. The apparatus of claim 7, wherein the asymmetric nodules, the connective stem, the lock, the one or more flexible tabs disposed within the planar opening of the lock, and the pull tab all comprise a single continuous piece of material.

9. The apparatus of claim 1, wherein the planar opening and the one or more flexible tabs disposed within the planar opening comprise a line of symmetry perpendicular to a central axis of the connective stem.

10. The apparatus of claim 1, wherein the planar opening and the one or more flexible tabs disposed within the planar opening comprise a line of symmetry parallel to a central axis of the connective stem.

11. The apparatus of claim 1, further comprising a clip coupled to the lock and configured to receive and secure in-place the connective stem.

12. The apparatus of claim 1, wherein the one or more flexible tabs disposed within the planar opening of the lock form a circular shape within the planar opening when the one or more flexible tabs are at rest.

13. The apparatus of claim 12, wherein the asymmetric nodules are geometrically identical and comprise circular cross-sections orthogonal to a central axis of the connective stem and wherein the diameter of the circular shape formed by the one or more flexible tabs disposed within the planar opening of the lock is smaller than the diameter of the largest circular cross-section of the asymmetric nodules.

14. The apparatus of claim 1, wherein the planar opening is circular.

15. The apparatus of claim 1, wherein the planar opening is ovular.

16. A self-locking tie cord apparatus, comprising:

a linear series of nodules coupled together by a connective stem; and a lock, coupled to a first end of the connective stem, comprising a planar opening and one or more flexible tabs disposed within the planar opening configured to limit the shape of the planar opening such that the shape of the planar opening prevents the nodules from passing through the planar opening when the one or more flexible tabs are at rest, wherein the lock is configured to allow a nodule from the series of nodules to pass through the planar opening in a first direction orthogonal to the planar opening when the nodule applies a first required force to the one or more flexible tabs in the first direction and in a second direction orthogonal to the planar opening and opposite the first direction when the nodule applies a second required force to the one or more flexible tabs in the second direction, wherein the first required force is sufficient to flex the one or more flexible tabs such that the shape of the planar opening allows the nodule to pass through the planar opening in the first direction, wherein the second required force is sufficient to flex the one or more flexible tabs such that the shape of the planar opening allows the nodule to pass through the planar opening in the second direction, and wherein the first required force is less than the second required force.

17. The apparatus of claim 16, wherein the first direction is a locking and tightening direction and wherein the second direction is a loosening and unlocking direction.

* * * * *